United States Patent [19]

Clubley et al.

[11] Patent Number: 5,360,550
[45] Date of Patent: Nov. 1, 1994

[54] INHIBITION OF SCALE

[75] Inventors: Brian G. Clubley, Wilmslow; Jan Rideout, Bolton, both of England

[73] Assignee: FMC Corporation, Philadelphia, Pa.

[21] Appl. No.: 154,689

[22] Filed: Nov. 18, 1993

Related U.S. Application Data

[63] Continuation of Ser. No. 769,990, Sep. 30, 1991, abandoned.

[30] Foreign Application Priority Data

Oct. 5, 1990 [GB] United Kingdom ............ 9021672.2

[51] Int. Cl.$^5$ .............................................. C02F 5/14
[52] U.S. Cl. .................................... 210/699; 210/700; 210/701; 252/180; 252/181; 422/15
[58] Field of Search .................. 210/696-701; 252/180, 181, 389.2, 389.23; 422/15

[56] References Cited

U.S. PATENT DOCUMENTS

| | | | |
|---|---|---|---|
| 4,046,707 | 9/1977 | Smith et al. | 252/180 |
| 4,563,284 | 1/1986 | Amjad | 210/699 |
| 4,913,823 | 4/1990 | Lipinski et al. | 210/699 |
| 5,160,630 | 11/1992 | Clubley et al. | 210/699 |
| 5,229,030 | 7/1993 | Clubley et al. | 252/180 |

OTHER PUBLICATIONS

Journal of Crystal Growth, 100 (1990) 109–116–Van Der Leeden, et al. "Effect of the Nuclear Weight . . . Retardation".

*Primary Examiner*—Peter A. Hruskoci
*Attorney, Agent, or Firm*—Patrick C. Baker; Robert L. Andersen

[57] ABSTRACT

A method of inhibiting the precipitation of barium scale from an aqueous system, comprising adding to the aqueous system a product having the formula I:

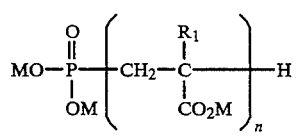

in which M is hydrogen or an alkali metal ion, an ammonium ion or a quanternized amine radical; $R_1$ is hydrogen or methyl; and n is an integer having an average value ranging from 4 to 20.

8 Claims, No Drawings

INHIBITION OF SCALE

This application is a continuation of U.S. application Ser. No. 07/769,990, filed Sep. 30, 1991, now abandoned.

The present invention relates to a method for inhibiting the precipitation of barium sulphate scale from aqueous systems.

In U.S. Pat. No. 4,046,707 there is described a method of inhibiting the precipitation of scale-forming salts of calcium, magnesium, barium and strontium, from aqueous systems. The method comprises adding to the aqueous system, a minor proportion of a product comprising a telomeric compound of formula:

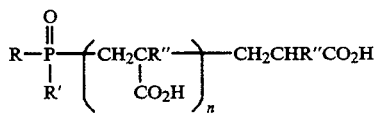

and salts thereof, in which R" is hydrogen, methyl or ethyl; R is hydrogen $C_1$–$C_{18}$ alkyl, $C_5$–$C_{12}$ cycloalkyl, aryl, aralkyl, a residue of formula

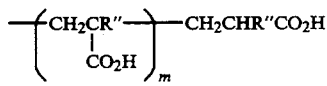

in which R" has its previous significance and the sum of m and n is an integer of at most 100, or R is a residue—OX, in which X is hydrogen or $C_1$–$C_4$ alkyl and R' is a residue OX in which X has its previous significance.

It will be apparent, therefore, that U.S. Pat. No. 4,046,707 is concerned with the inhibition of a wide range of different types of scale, and with a very broad scope of compounds to achieve the said inhibition of a disparate range of scales.

We have now found, unexpectedly, that when addressing the specific problem of the inhibition of barium sulphate scale formation in aqueous systems, outstandingly good results are obtained when selecting a very narrow range of compounds which, although broadly envisaged within the scope of the compounds of U.S. Pat. No. 4,046,407 are not specifically mentioned therein, certainly not in relation to barium sulphate scale inhibition, specifically.

Accordingly, the present invention provides a method of inhibiting the precipitation of barium sulphate scale from an aqueous system, comprising adding to the aqueous system, a product having the formula I:

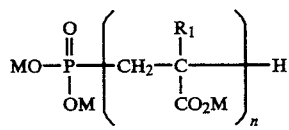

in which M is hydrogen or an alkali metal ion, an ammonium ion or a quanternised amine radical; $R_1$ is hydrogen or methyl; and n is an integer having an average value ranging from 4 to 60, preferably ranging from 4 to 20.

Alkali metal cations M are principally, lithium, sodium and potassium ions; ammonium ions include, e.g. trimethylammonium, triethylammonium, bis(2-hydroxyethyl) ammonium, tris(2-hydroxyethyl) ammonium and bis(2-hydroxyethyl)-2-(hydroxy-3-p-nonylphenoxypropyl) ammonium ions; and quanternised amine radicals include those having the formula $N^{\oplus}(R_a R_b R_c R_d)_4 An^{\ominus}$ in which $R_a$, $R_b$, $R_c$ and $R_d$ are the same or different, and each is $C_1$–$C_6$ alkyl especially methyl or ethyl, or each is 2-hydroxyethyl, or one of $R_a$, $R_b$, $R_c$ and $R_d$ is benzyl, and the other three of $R_a$, $R_b$ $R_c$ and $R_d$ are $C_1$–$C_6$ alkyl, especially methyl or ethyl, and $An^{\ominus}$ is a halide ion, especially chloride or bromide, hydroxyl or sulphate.

The products of formula I are known, having been broadly described in U.S. Pat. No. 2,957,931 and, of course, in U.S. Pat. No. 4,046,707.

The products of formula I may be produced by reacting the appropriate molar ratio of acrylic acid, methacrylic acid or a $C_1$–$C_6$ alkyl ester thereof, depending upon the desired value of n, with one mole of di-$C_1$–$C_4$ alkylphosphite, e.g. diethylphosphite, or di-arylphosphite, e.g. diphenylphosphite, followed by subsequent hydrolysis.

The reaction may be conveniently conducted in the presence of a polymerization initiator such as bisazisobutyronitrile; organic peroxides such as benzoyl peroxide, methylethylketone peroxide, di-tertiarybutyl peroxide or mono-butyl hydroperoxide; or oxidizing agents such as hydrogen peroxide, sodium perborate or sodium persulphate.

At completion of the reaction between e.g. diethyl phosphite and the (meth)acrylic monomer, the crude reaction mixture may be purified, if desired, by conventional techniques, for example, any excess alkyl or di-aryl phosphite reactant may be removed by distillation of the reaction mixture. Moreover, any ester groupings on the (meth)acrylic moieties in the compounds of formula I may be converted into carboxyl functions by, e.g., acid hydrolysis. After, such acid hydrolysis, the hydrolyzed product may be evaporated to dryness, to provide solid material of formula I.

Salts of the products of formula I in which some or all of the acidic hydrogens M in the compounds of formula I have been replaced by alkali metal-ammonium—or quanternised amine cations, may be prepared by mixing an aqueous or alcoholic solution containing the requisite base, in an amount which may be more than, equal to or less than the stoichiometric requirement for full replacement of the acidic hydrogens. The solvent for the base may then be removed, e.g. by evaporation.

Many of the aqueous systems to be treated according to the method of the present invention are sufficiently basic, that the system itself is adequate to effect neutralization, so that when adding the acidic form of the compound of formula I, it is convened in situ into an alkali metal version.

The amount of the product of formula I, or salt thereof, used in the method according to the present invention may range e.g. from 1 to 200 ppm, preferably from 2 to 20 ppm, based on the weight of the aqueous system.

Aqueous systems which may be effectively treated according to the present invention include e.g. cooling water systems, steam generating systems, sea-water evaporators reverse osmosis equipment, bottle washing plants, paper manufacturing equipment, sugar evaporator equipment, soil irrigation systems, hydrostatic cookers, gas scrubbing systems, closed circuit heating systems, aqueous—based refrigeration systems and downwell systems, top-side systems.

The products of formula I may be used in the method of the present invention in conjunction with other materials known to be useful in water treatment.

Examples of further water treatment additives include one or more of corrosion inhibitors; metal deactivators; further scale inhibitors/dispersing agents; threshold agents; precipitating agents; oxygen scavengers; sequestering agents; antifoaming agents; and biocides.

Corrosion inhibitors which may be used include water-soluble zinc salts; phosphates; polyphosphates; phosphonic acids or their salts, e.g. hydroxyethyl diphosphonic acid (HEDP), nitrilotris methylene phosphonic acid, methylmine dimethylene phosphonocarboxylic acids (e.g. those described in DE-OS 2632774), hydroxyphosphonacetic acid, 2-phosphonobutane-1,2,4-tricarboxylic acid and those described in GB-PS 1572406; nitrates e.g. sodium nitrate; nitrites e.g. sodium nitrite; tungstates e.g. sodium tungstate; silicates e.g. sodium silicate; N-acylsarcosines; N-acylimino diacetic acids; ethanolamines; fatty amines; and polycarboxylic acids, e.g. polymaleic acid and polyacrylic acid (and their respective alkali metal salts), copolymers of maleic anhydride e.g. with sulphonated styrene, copolymers of acrylic acid e.g. with hydroxyalkylated acrylic acid, and substituted derivatives of polymaleic and polyacrylic acids and their copolymers.

Metal deactivators especially for copper, include benzotriazole, bis-benzotriazole or copper—deactivating derivatives of benzotriazole or tolutriazole, or their Mannich base derivatives, or mercaptobenzotriazole.

Further scale inhibitors/dispersing agents include polymerized acrylic acid (or its salts), phosphinopolycarboxylic acids (e.g. those described in GB-PS 1458235), the cotelomers described in EP-PS 0150706, hydrolyzed polyacrylonitrile, polymerized methacrylic acid and its salts, polyacrylamide and copolymers of acrylamide with acrylic and methacrylic acids, lignin sulphonic acid and its salts, tannin naphthalene sulphonic acid/formaldehyde condensation products, starch and its derivatives, cellulose, acrylic acid/lower alkyl hydroxy-acrylate copolymers (e.g. those described in U.S. Pat. No. 4,029,577) styrene/maleic anhydride copolymers and sulphonated styrene homopolymers (e.g. those described in U.S. Pat. No. 4,374,733), and combinations of these.

Specific threshold agents include 2-phosphonobutane-1,2,4-tri-carboxylic acid, hydroxyethyl diphosphonic acid (HEDP), hydrolyzed polymaleic anhydride and its salts, alkyl phosphonic acids, hydroxyphosphonacetic acid, 1-aminoalkyl-1,1-diphosphonic acids and their salts, and alkali metal polyphosphates.

It will be clear from the above lists that certain additive compounds, e.g. phosphonocarboxylic acids, function both as scale inhibitors and as corrosion inhibitors. Precipitating agent co-additives which may be used are alkali metal orthophosphates or carbonates; oxygen scavengers include alkali metal sulphites and hydrazines; sequestering agents are nitrilotdacetic acid and its salts; antifoaming agents are silicones, e.g. polydimethylsiloxanes, distearyl sebacimide, distearyl adipamide, and related products derived from ethylene oxide and/or propylene oxide condensations, in addition to fatty alcohols such as capryl alcohol and its ethylene oxide condensates. Biocides which may be used are, e.g. amines, quaternary ammonium compounds, m-chlorophenols, sulphur-containing compounds such as sulphones, methylene bis thiocyanates and carbonates, isothiazolines, brominated propionamides, triazines, phosphonium compounds, chlorine and chlorine-release agents, and organometailic compounds such as tributyl tin oxide.

Particularly interesting additive packages for use in the method of the present invention are those comprising one or more compounds of formula I in combination with one or more co-additives selected from polymaleic acid or polyacrylic acid, or their copolymers or substituted copolymers; hyctroxyphosphono-acetic acid; HEDP; PBSAM; triazoles such as tolutriazole; molybdates; and nitrites.

The following Examples further illustrate the present invention. Examples A, B, C and D relate to the preparation of compounds of formula I for use in the method of the present invention.

EXAMPLE A 100 g of ethyl acrylate and 15 g of di-tert-butylperoxide are added separately, dropwise, to 138 g of diethyl phosphite, over 4 hours, at 140° C. This temperature is maintained for a further 2 hours, after the additions are complete. Unreacted diethyl phosphite is removed by distillation under reduced pressure, and the residue is suspended in 400 g of 18% w/w hydrochloric acid, and the suspension so obtained is heated, under reflux conditions, for 48 hours.

The resulting solution is evaporated to dryness, under reduced pressure, to give 68 g of product (94% of the theoretical yield based on acrylic acid).

The product obtained has an $M_n=644$ and $M_w=941$, giving a ratio $M_w/M_n=1.46$. Microanalysis of the product gives 8.15% P; corresponding to an average value of intoget n=4.

EXAMPLE B

Using the procedure set out in Example A, 160 g of ethyl acrylate and 15 g of di-tert butylperoxide are added separately, dropwise, to 55.2 g of diethylphosphite to give 124 g (108% of the theoretical yield based on acrylic acid) of a product having $M_n=669$ and $M_w=1019$, giving a ratio $M_w/M_n$ of 1.52. Microanalysis of the product gives: 4.7% P; corresponding to an average value of integer n=8.

EXAMPLE C

Using the procedure set out in Example A, 88.9 g of ethyl acrylate and 7.3 g of di-tert butyl peroxide are added separately, dropwise, to 15.5 g of diethyl phosphite to give 65 g 103% of the theoretical yield based on acrylic acid) of a product having $M_n=732$ and $M_w=2224$ giving a ratio $M_w/M_n$ of 3.04. Microanalysis of the product gives: 3.15% P; corresponding to an average value of integer n=12.

EXAMPLE D

Using the procedure described in Example A, 92.3 g of ethyl acrylate and 7.2 g of di-tert butyl peroxide are added separately, dropwise, to 10.6 g of diethyl phosphite to give 71 g of product (107% of theoretical yield based on acrylic acid) having $M_n=790$ and $M_w=2837$, giving a ratio $M_w/M_n=3.59$. Microanalysis of the product gives: 2.1% P; corresponding to an average value of integer n of 20.

EXAMPLE E

Using the procedure described in Example A, 172.2 g of methyl acrylate and 3.75 g of di-tert-butyl peroxide are added separately, dropwise to 27.51 g of dimethyl phosphite to give 164 g of product (114% of theoretical yield based on acrylic acid) having $M_n = 1978$ and $M_w = 8205$ giving a ratio of $M_w/M_n$ of 4.15. Microanalysis of the product gives 1.18%P corresponding to an average value of integer $n = 35$.

EXAMPLES 1 AND 2

Barium Sulphate Inhibition

This test uses a mixture of natural sea water (20% by weight) and synthetic formation water (80% by weight) to simulate downwell conditions. The test solution contains 840 mg/l $Ba^{2+}$, 88 mg/l $Sr^{2+}$, 848 mg/l $Ca^{2+}$ and 485.2 mg/l $SO_4^{2-}$ and is altered to pH 4.5 at the start of the test. The test is conducted in a water bath at 95° C. The concentration of $Ba^{2+}$ in solution is determined on completion of the test. The test results are summarised in Table 1:

TABLE 1

| Example | Additive | Additive Concentration | % Inhibition |
|---|---|---|---|
| 1 | Product Example A | 50 ppm | 89.1 |
| 2 | Product Example B | 50 ppm | 89.1 |

EXAMPLES 3 TO 6

Repeating the procedure in Examples 1 and 2 but using a mixture of 40% by weight of formation water and 60% by weight of sea water, at 95° C., the following results are obtained:

TABLE 2

| Example | Additive | Additive Concentration | % Inhibition |
|---|---|---|---|
| 3 | Product Example A | 50 ppm | 62.3 |
| 4 | Product Example B | 50 ppm | 78.9 |
| 5 | Product Example C | 50 ppm | 90.1 |
| 6 | Product Example D | 50 ppm | 80.8 |

We claim:

1. A method of inhibiting the precipitation of barium sulphate scale from an aqueous system, comprising adding to the aqueous system a product having the formula I:

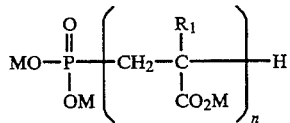

in which M is hydrogen or an alkali metal ion, an ammonium ion or a quanternised amine radical; $R_1$ is hydrogen or methyl; and n is an integer having an average value ranging from 4 to 20.

2. A method according to claim 1 in which each M is hydrogen.

3. A method according to claim 1 in which $R_1$ is hydrogen.

4. A method according to claim 1 in which the amount of the product of formula I, or salt thereof, added to the aqueous system ranges from 1 to 200 ppm, based on the weight of the aqueous system.

5. A method according to claim 4 in which the amount of the product of formula I, or salt thereof, added to the aqueous system ranges from 2 to 20 ppm, based on the weight of the aqueous system.

6. A method according to claim 1 in which the aqueous system treated is a cooling water system, a steam generating system, an aqueous system of a sea-water evaporator, an aqueous system of reverse osmosis equipment, an aqueous system of bottle washing plants, an aqueous system of paper manufacturing equipment, an aqueous system of sugar evaporator equipment, a soil irrigation system, in aqueous system of a hydrostatic cooker, an aqueous gas-scrubbing system, an aqueous closed-circuit heating system, an aqueous based refrigeration system or an aqueous down-well system.

7. A method according to claim 1 in which the product of formula I, or salt thereof, is used in combination with one or more further materials known to be useful in water treatments selected from one or more of a corrosion inhibitor, a metal deactivator, a further scale inhibitor/dispersing agent, a threshold agent, a precipitating agent, and oxygen scavenger, a sequestering agent, an antifoaming agent and a biocide.

8. A method according to claim 1 in which the product of formula I, or salt thereof, is used in combination with one or more further materials known to be useful in water treatment selected from one or more of polymaleic acid or polyacrylic copolymers; hydroxyphosphonacetic acid; hydroxyethyl diphosphonic acid; 2-phosphonobutane-1,2,4-tricarboxylic acid; tolutriazole; a molybdate; and a nitrite.

* * * * *